US006859531B1

(12) United States Patent
Deisher (10) Patent No.: US 6,859,531 B1
(45) Date of Patent: Feb. 22, 2005

(54) RESIDUAL ECHO ESTIMATION FOR ECHO CANCELLATION

(75) Inventor: Michael E. Deisher, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 475 days.

(21) Appl. No.: 09/663,748

(22) Filed: Sep. 15, 2000

(51) Int. Cl.[7] .............................................. H04M 9/08

(52) U.S. Cl. ........................... 379/406.05; 379/406.01; 379/406.06; 379/406.08; 379/406.09; 379/406.11; 379/406.13; 379/406.12

(58) Field of Search ....................... 379/406.01–406.16

(56) References Cited

U.S. PATENT DOCUMENTS

| | | | | |
|---|---|---|---|---|
| 5,436,940 A | * | 7/1995 | Nguyen | |
| 5,732,134 A | | 3/1998 | Sih | 379/406 |
| 5,937,060 A | | 8/1999 | Oh | 379/406 |
| 6,459,942 B1 | * | 10/2002 | Markow et al. | |
| 6,564,184 B1 | * | 5/2003 | Eriksson | |

FOREIGN PATENT DOCUMENTS

| | | | | |
|---|---|---|---|---|
| SE | WO000025441 | * | 5/2000 | |
| WO | WO-00/25441 | | 5/2000 | H04B/3/23 |

OTHER PUBLICATIONS

Gustafsson et al, "combined Acoustic Echo Control and Noise Reduction for hands–Free telephony"; 1998, Signal Processing, 64, No. 1, Jan. 1998; ELSEVIER; pp. 21–32.*
Turbin, V., et al., "Using Psychoacoustic Criteria In Acoustic Echo Cancellation Algorithms", *Proceedings of the International Workshop on Acoustic Echo and Noise Control*, Poster Session I, Paper No. 67, 4 p., (1997).
Turbin, V., et al., "Using Psychoacoustic Criteria In Acoustic Echo Cancellation Algorithms", *Proceedings of the International Workshop on Acoustic Echo and Noise Control*, Poster Session I, Paper No. 67, 4 p., (1997).
Boll, S.F., "Suppression of Acoustic Noise in Speech Using Spectral Subtraction", *IEEE Transactions on Acoustics, Speech, and Signal Processing*, vol. ASSP–27, 113–120, (Apr. 1979).
Ephraim, Y., et al., "Speech Enhancement Using a Minimum Mean–Square Error Short–Time Spectral Amplitude Estimator", *IEEE Transactions on Acoustics, Speech, and Signal Processing*, vol. ASSP–32, 1109–1121, (Dec. 1984).
Gay, S.L., et al., "The Fast Affine Projection Algorithm", *Conference Proceedings: The 1995 International Conference on Acoustics, Speech, and Signal Processing*, vol. 5, 3023–3026, (May 1995).
Gilloire, A., et al., "Adaptive Filtering in Subbands with Critical Sampling: Analysis, Experiments, and Application to Acoustic Echo Cancellation", *IEEE Transactions on Signal Processing*, vol. 40, 1862–1875, (Aug. 1992).
Glentis, G., et al., "A Unified View: Efficient Least Squares Adaptive Algorithms for FIR Transversal Filtering", *IEEE Signal Processing Magazine*, vol. 16, 13–41, (Jul. 1999).

(List continued on next page.)

*Primary Examiner*—F. W. Isen
*Assistant Examiner*—Ramnandan Singh
(74) *Attorney, Agent, or Firm*—Schwegman, Lundberg, Woessner & Kluth, P.A.

(57) ABSTRACT

Real and imaginary components of the discrete Fourier transform (DFT) of the residual echo in an acoustic echo cancellation system are separately estimated using mapping functions derived without an assumption of statistical independence between separate components of a near-end microphone input signal. The residual echo estimator calculates the real and imaginary components using an approximation of the microphone input signal without the echo. A different approximation is used depending on whether the near-end talker and/or the far-end talker are talking.

27 Claims, 4 Drawing Sheets

OTHER PUBLICATIONS

Gustafsson, S., et al., "Combined Acoustic Echo Control and Noise Reduction for Hands–Free Telephony", *Signal Processing, 64*, 21–32, (1998).

Slock, D.T., et al., "Numerically Stable Fast Transversal Filters for Recursive Least Squares Adaptive Filtering", *IEEE Transactions on Signal Processing*, vol. 39, 92–114, (Jan. 1991).

* cited by examiner

RESIDUAL ECHO ESTIMATION FOR ECHO CANCELLATION

FIELD

The present invention relates generally to echo cancellation systems, and more specifically to systems for reducing residual echo in echo cancellation systems.

BACKGROUND OF THE INVENTION

In "speakerphone" applications, the "near-talker" is the person using the speakerphone, and the "far-talker" is the person on the far end of the telephone line. The far-talker's speech is broadcast (played through a speaker) into the room (or other acoustic enclosure) that houses the speakerphone and the near-talker. An echo is produced by the far-talker's speech propagating through the room and being subsequently received at the microphone. Acoustic echo cancelers (AEC) are used to cancel the echo received at the microphone. The acoustic echo canceler is typically an adaptive filter that models the various echo paths in the room. Extreme cases exist where the acoustic echo canceler briefly fails to cancel the echo, such as prolonged double-talk or rapid near-talker movement. In these cases, a far-talker might hear a short burst of his/her own voice as an echo.

Residual echo suppression techniques attempt to remove the echo that remains after acoustic echo cancellation, thereby preventing the far-talker from hearing such bursts while still allowing the near-talker's voice to pass through undisturbed. Residual echo suppression techniques have been the subject of research, and papers have been published describing the work. Examples include: S. Gustafsson, et al., "Combined Acoustic Echo Control and Noise Reduction for Hands-Free Telephony," Signal Processing, Vol. 64, pp. 21–32, 1998, hereinafter referred to as "Gustafsson;" and V. Turbin, et al., "Using Psychoacoustic Criteria in Acoustic Echo Cancellation Algorithms,". Proc. IWAENC'97, London, pp. 53–56, September 1997, hereinafter referred to as "Turbin." Despite ongoing research, current residual echo suppression techniques are not completely effective in removing residual echo.

DESCRIPTION OF EMBODIMENTS

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

The method and apparatus of the present invention provide a mechanism to estimate residual echo in an acoustic echo cancellation system. An adaptive filter produces an estimate of the echo, and subtracts the estimate of the echo from the microphone input signal. When the echo, and the estimate of the echo, do not closely match, an undesirable residual echo remains in the signal. The method and apparatus of the present invention provide a residual echo estimator that separately estimates real and imaginary components of the discrete Fourier transform (DFT) of the residual echo without assuming statistical independence between the various components of the microphone input signal. The residual echo estimator calculates the real and imaginary components using an approximation of the microphone input signal without the echo. A different approximation is used depending on whether the near-talker and/or the far-talker are talking.

Figure 1:
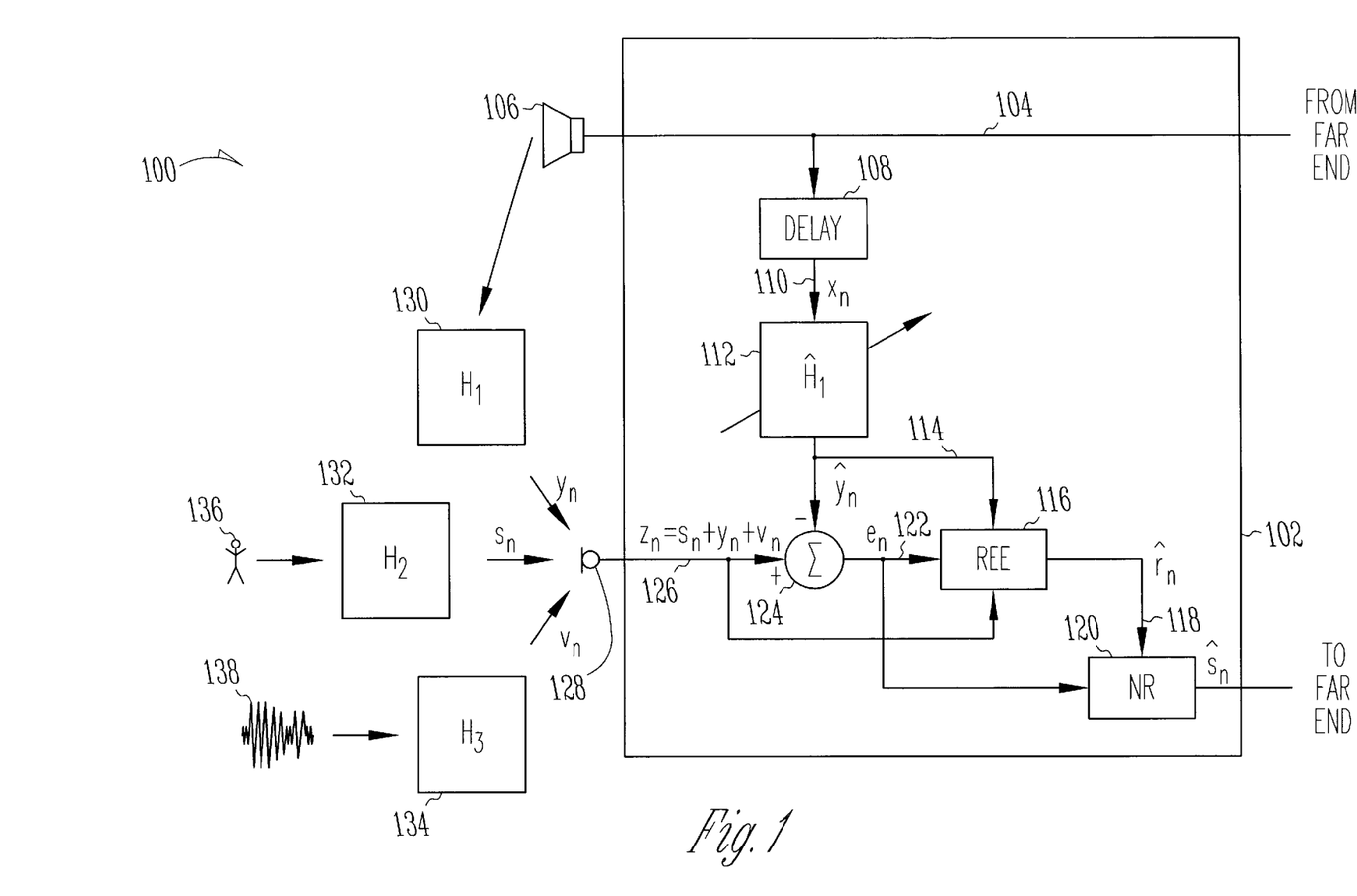
FIG. 1 shows an acoustic echo cancellation system with residual echo estimation.

FIG. 1 shows a speakerphone with echo cancellation and residual echo estimation. Speakerphone 102 includes adaptive filter 112, residual echo estimator (REE) 116, summer 124, noise reduction (NR) circuit 120, speaker 106, and microphone 128. Speakerphone 102 can include many other circuits such as processors, amplifiers, and the like. Many of these other circuits are omitted from FIG. 1 to more clearly show novel portions of the present invention. Speakerphone 102 includes speaker 106 that plays speech from the far-talker. Far-talker speech is received from the far end on node 104, and is played through speaker 106. Speech data on node 104 is also delayed by delay circuit 108 prior to being operated upon by adaptive filter 112.

In some embodiments, speech data on node 104 is digital data. In these embodiments, a digital-to-analog (D/A) converter converts digital data to an analog waveform for play by speaker 106. Also in these embodiments, delay circuit 108 can be a digital delay element such as a register file or shift register. In other embodiments, data on node 104 is analog data. In these embodiments, delay circuit 108 can be an analog delay element, such as a lumped or distributed analog delay line. Delay circuit 108 can be a fixed delay or a variable delay. In general, when the echo path is larger, the delay in delay circuit 108 is larger. For example, when speakerphone 102 is used in a car, the echo path is short and the delay of delay circuit 108 is short. Also for example, when speakerphone 102 is used in a large conference room, the echo path is longer, and the delay of delay circuit 108 is correspondingly longer.

In operation, speaker 106 plays the far-end speech into an acoustic environment. An echo signal $y_n$ from the acoustic enclosure is received at microphone 128. The effect of the acoustic enclosure on the echo is represented by block 130, which contains transfer function $H_1$. That is to say, speech played from speaker 106 is operated upon by transfer function $H_1$, and is then received at microphone 128. In addition to echo signal $y_n$, microphone 128 also receives near-end speech signal $s_n$ and near-end noise signal $v_n$. Near-end speech signal $s_n$ represents speech from near-talker 136 as modeled by transfer function $H_2$, shown in block 132, and noise signal $v_n$ represents noise 138 as modeled by transfer function $H_3$, shown in block 134. Microphone 128, therefore, receives the sum of $y_n$, $s_n$, and $v_n$. This is shown at node 126 as $z_n$.

$y_n$ and $v_n$, at least to some degree, represent undesirable components of $z_n$. For example, $y_n$ is the echo caused by the coupling of speaker 106 and microphone 128. When a large component of $y_n$ does not get canceled, and becomes part of the signal sent back to the far-end, the far-talker can hear his/her voice after undergoing a delay, and this can cause confusion during a phone call. Also for example, if $v_n$ is unduly large, then the far-talker hears a large amount of noise, and this can interrupt a phone conversation. In contrast to the above, the near-end speech signal is, in general, a desirable component of $z_n$. When the near-end speech is faithfully transmitted to the far end, then effective communications can take place.

Adaptive filter 112 approximates the transfer function of the echo as $\hat{H}_1$, and generates an estimate $\hat{y}_n$ of the echo signal $y_n$ from the delayed far-end speech signal $x_n$. Summer 124 subtracts $\hat{y}_n$ from $z_n$ to create $e_n$ on node 122. Adaptive filter 112 can be any filter suitable for use in an adaptive echo cancellation system. Examples include, but are not limited to: S. Gay, S Tavathia, "The fast affine projection algorithm", Proc. IEEE ICASSP, Detroit, USA, 1995. pp. 3023–3026; and G. Glentis, K. Berberidis, S. Theodoridis, "A unified view: Efficient least squares adaptive algorithms for FIR transversal filtering," IEEE Signal Processing Magazine, vol. 16, pp. 13–41, July 1999.

$z_n$, $y_n$, and $e_n$ are input to residual echo estimator 116 to generate an estimate $\hat{r}_n$ of the residual echo. The residual echo estimate and $e_n$ are input to noise reduction (NR) circuit 120 to reduce the residual echo in $e_n$. Ideally, $\hat{y}_n$ would match $y_n$ exactly and $e_n$ would contain only the near-end speech signal $s_n$ and perhaps some background noise $v_n$. However, this is practically impossible and $e_n$ always contains some amount of residual echo $r_n = y_n - \hat{y}_n$, i.e., $e_n = s_n + v_n + r_n$. When the far-talker is silent ($x_n = 0$), the input to the noise reduction algorithm is simply speech plus background noise. When the far-talker is active, the "noise" (or undesirable components) includes the background noise $v_n$ along with echo $y_n$. Noise reduction circuit 120 uses a noise spectral estimator to track the near-stationary background noise. The quasi-stationary residual echo is estimated separately via the residual echo estimator (REE). NR is then applied using a composite "noise" estimate.

In some embodiments, noise reduction circuit 120 leaves a small amount of near-stationary background noise to mask residual echo. This can be accomplished using algorithms discussed in Turbin (see background, above).

Any of a large class of speech spectral estimators could be used to modify the noise power spectral estimate to include residual echo. Examples of suitable noise reduction algorithms and circuits can be found in: S. F. Boll, "Suppression of acoustic noise in speech using spectral subtraction," IEEE Trans. Acoust. Speech Signal Process. ASSP-27 (April 1979) 113–120; and Y. Ephraim, D. Malah, "Speech enhancement using a minimum mean-square error short-time spectral amplitude estimator," IEEE Trans. Acoust. Speech Signal Process. 32(6) (December 1984) 1109–1121.

Residual Echo Estimation

Prior work by Gustafsson (see background, above) assumes that the a priori residual echo statistics may be estimated via a real-valued deterministic mapping function $F_n$ applied to the adaptive filter output.

$$E\{|R_n(k)|^2\} = \left(\frac{F_n(k)}{1-F_n(k)}\right)^2 \cdot E\{|\hat{Y}_n(k)|^2\} \quad (1)$$

The mapping function is $$F_n(k) = \frac{E\{|Z_n(k)|^2\} - E\{|E_n(k)|^2\} - E\{|\hat{Y}_n(k)|^2\}}{E\{|Z_n(k)|^2\} - E\{|E_n(k)|^2\} + E\{|\hat{Y}_n(k)|^2\}} \quad (2)$$

where capital letters represent the discrete Fourier transform (DFT) components of the corresponding variables represented by small letters. For example, $E_n(k)$ represents DFT components of $e_n$.

Gustafsson omits details on estimation of $E\{|Z_n(k)|^2\}$, $E\{|E_n(k)|^2\}$, and $E\{|\hat{Y}_n(k)|^2\}$ from their work cited above, but they are typically estimated using a "leaky average" of sample values. Experimental results obtained using Euclidean distances between the true and estimated residual echo power spectrum to measure the success of the estimator showed that instantaneous values give very good results. Also in Gustafsson, $F_n$ was divided into subbands and each $F_n(k)$ was replaced by the average value in its subband, although the number and width of the subbands were not discussed. Where $E\{|\hat{Y}_n(k)|^2\}$ was too small, $F_n(k)$ was not included in the average. Experimental results indicate that low estimation error is achieved when the subband size is one DFT bin.

Equations (1) and (2), above, make two assumptions: that $F_n$ is real-valued, and that $s_n$, $v_n$, and $y_n$ are statistically independent. Experimental results using equations (1) and (2) for residual echo estimation yielded signal-to-noise ratios of the estimated residual echo power spectrum of, at best, about 2.0 dB. The derivation of equation (2) is now discussed, with the two assumptions in mind. The two assumptions are removed, and the results are then presented.

The SNR-like measurement was $$\frac{1}{N}\sum_{n=0}^{N-1} 10\log_{10} \frac{\sum_{k=0}^{K-1}\left(|\hat{R}_n(k)|^2\right)^2}{\sum_{k=0}^{K-1}\left(|\hat{R}_n(k)|^2 - |R_n(k)|^2\right)^2}$$

The residual echo spectral components $$R_n(k) = Y_n(k) - \hat{Y}_n(k) \quad (3)$$

are related to the echo $Y_n(k)$ by defining a real-valued transfer function $F_n$ such that $$R_n(k) = F_n(k) \cdot Y_n(k) \quad (4)$$

Assuming that the mapping function $F_n$ is real-valued, substituting (4) into (3) and yields $$\hat{Y}_n(k) = [1 - F_n(k)] \cdot Y_n(k) \quad (5)$$

which leads to $$E\{|Y_n(k)|^2\} = \frac{1}{(1-F_n(k))^2} E\{|\hat{Y}_n(k)|^2\} \quad (6)$$

Using the relationship of (4) in (6) yields $$E\{|R_n(k)|^2\} = \left(\frac{F_n(k)}{1 - F_n(k)}\right)^2 \cdot E\{|\hat{Y}_n(k)|^2\} \quad (7)$$

Assuming that $s_n$, $v_n$, and $y_n$ are statistically independent and zero mean, the following relationships hold true.

$$E\{|Z_n(k)|^2\} = E\{|S_n(k)|^2\} + E\{|V_n(k)|^2\} + E\{|Y_n(k)|^2\} \quad (8a)$$

$$E\{|E_n(k)|^2\} = E\{|S_n(k)|^2\} + E\{|V_n(k)|^2\} + E\{|R_n(k)|^2\} \quad (8b)$$

Subtracting (8b) from (8a) and substituting from (6) and (7) yields $$E\{|Z_n(k)|^2\} - E\{|E_n(k)|^2\} = \left[\frac{1}{(1-F_n(k))^2} - \frac{F_n^2(k)}{(1-F_n(k))^2}\right] \cdot E\{|\hat{Y}_n(k)|^2\} \quad (9a)$$

$$(1-F_n(k))^2 \cdot (E\{|Z_n(k)|^2\} - E\{|E_n(k)|^2\}) = (1-F_n^2(k)) \cdot E\{|\hat{Y}_n(k)|^2\} \quad (9b)$$

Solving the quadratic equation for $F_n(k)$ yields two solutions, $F_n(k)=1$ and the more meaningful solution:

$$F_n(k) = \frac{E\{|Z_n(k)|^2\} - E\{|E_n(k)|^2\} - E\{|\hat{Y}_n(k)|^2\}}{E\{|Z_n(k)|^2\} - E\{|E_n(k)|^2\} + E\{|\hat{Y}_n(k)|^2\}} \quad (10)$$

Experimental results with $s_n=0$ showed that the error in the deterministic mapping is due to the two assumptions in the derivation: that F is real-valued; and that $s_n$, $v_n$, and $y_n$ are statistically independent. Experimental results showed that a more accurate residual echo estimate was achieved with a non-real-valued mapping function F that had been derived without the assumption of statistical independence.

Removal of Assumption that F is Real-Valued

Letting $F_n(k) = F_{rn}(k) + jF_{in}(k)$, and carrying this definition through (4) and (5), into (6) and (7), and finally into (9) leads to a family of solutions to the quadratic equation. When $F_{in}(k)$ is forced to zero, the solution of (10) is realized. When $F_{rn}(k)$ is forced to zero, the solution is $$F_n(k) = \sqrt{\frac{E\{|Z_n(k)|^2\} - E\{|E_n(k)|^2\} - E\{|\hat{Y}_n(k)|^2\}}{E\{|Z_n(k)|^2\} - E\{|E_n(k)|^2\} - E\{|\hat{Y}_n(k)|^2\}}} \quad (11)$$

Experimental results showed that this choice was not necessarily better than that already proposed. Restructuring the problem, however, leads to an unambiguous mapping. Instead of (4), separate mapping functions can be used for the real and imaginary parts of $R_n(k)$.

$$R_{rn}(k) = F_{rn}(k) \cdot Y_{rn}(k) \quad (12a)$$

$$R_{in}(k) = F_{in}(k) \cdot Y_{in}(k) \quad (12b)$$

This leads to separate solutions for the real and imaginary parts. Equation (10) is replaced by two solutions of the form $$F_m(k) = \frac{Z_m^2(k) - E_m^2(k) - \hat{Y}_m^2(k)}{Z_m^2(k) - E_m^2(k) + \hat{Y}_m^2(k)} \quad (13)$$

This approach leads to a significant improvement in the experimental results. The residual echo estimate improved to 45 dB SNR (noise free case with no near talker). The numerically well-behaved formulation shown in (16), below, was also used to attain this result.

Removal of Assumption of Statistical Independence

Removing the statistical independence assumption turns equation (10) into the following:

$$F_n(k) = \frac{|Z_n(k)|^2 - |E_n(k)|^2 - 2Re\{\hat{Y}_n(k)(S_n(k) + V_n(k))^*\} - |\hat{Y}_n(k)|^2}{|Z_n(k)|^2 - |E_n(k)|^2 - 2Re\{\hat{Y}_n(k)(S_n(k) + V_n(k))^*\} + |\hat{Y}_n(k)|^2} \quad (14)$$

When combined with (13), this becomes two equations of the form $$F_m(k) = \frac{Z_m^2(k) - E_m^2(k) - \hat{Y}_m(k)(S_m(k) + V_m(k)) - \hat{Y}_m^2(k)}{Z_m^2(k) - E_m^2(k) - \hat{Y}_m(k)(S_m(k) + V_m(k)) + \hat{Y}_m^2(k)} \quad (15)$$

The cross-term depends on two unknowns, the speech and noise spectral components. The uncertainty in the calculation of the mapping function has been isolated to the cross-term estimate. Several choices were investigated for approximation of the cross-term including $Z_n(k)\hat{Y}_n(k)$, $\hat{S}_{n-1}(k)\hat{Y}_n(k)$, and $0.5[Z_n(k)+\hat{S}_{n-1}(k)]\hat{Y}_n(k)$. Distortion of the near-end was measured as the Itakura-Saito distortion between $\hat{s}_n$ and $s_n$. Far-end suppression was measured using the echo return loss enhancement (ERLE). Including a cross-term was found to measurably improve residual echo estimation during double-talk. However, the near-end was not free of distortion and some residual echo was still audible. Results (discussed below) are shown in Table 1.

Avoiding Numerical Sensitivity

Equation (7) is sensitive to values of $F_n(k)$ near one. The alternative formulation above also suffers from this problem. In one embodiment, this situation is avoided using $$R_m^2(k) = \left(\frac{F_m(k)}{1 - F_m(k)}\right)^2 \hat{Y}_m^2(k) = \frac{(Z_m^2(k) - E_m^2(k) - \hat{Y}_m(k)(S_m(k) + V_m(k)) - \hat{Y}_m^2(k))^2}{\hat{Y}_m^2(k)} \quad (16)$$

and set $R_n(k)$ to zero when $\hat{Y}_{rn}^2(k)$ or $\hat{Y}_{in}^2(k)$ is small (<10.0). This change substantially improved the experimental results. The residual echo estimate as calculated in (1) improved from approximately 2 dB to approximately 11.5 dB SNR (noise free case with no near talker) with this modification.

TABLE 1

Sample results for simulated near, far, and double talk scenarios with and without noise for various cross-terms.

|  | AEC Only | NR Only | No Cross-term | Cross-term = $\hat{Y}_n(k)Z_n(k)$ | Cross-term = $\hat{Y}_n(k)[Z_n(k) + \hat{S}_{n-1}(k)]/2$ |
|---|---|---|---|---|---|
| No Noise |  |  |  |  |  |
| ISD - DT | 9.795 | 9.207 | 4.425 | 1.001 | 0.956 |
| ISD - Near | 0.000 | 0.073 | 0.381 | 0.089 | 0.154 |
| ERLE - | 46.4 dB | 44.0 dB | −23.8 dB | 33.2 dB | 35.1 dB |

TABLE 1-continued

Sample results for simulated near, far, and double talk scenarios with and without noise for various cross-terms.

|  | AEC Only | NR Only | No Cross-term | Cross-term = $\hat{Y}_n(k)Z_n(k)$ | Cross-term = $\hat{Y}_n(k)[Z_n(k) + \hat{S}_{n-1}(k)]/2$ |
|---|---|---|---|---|---|
| Far Noise |  |  |  |  |  |
| ISD - DT | 14.523 | 9.182 | 4.321 | 1.142 | 1.081 |
| ISD - Near | 1.219 | 0.124 | 0.456 | 0.156 | 0.220 |
| ERLE - Far | 53.6 dB | 46.9 dB | −22.7 dB | −1.9 dB | 43.0 dB |

Sample Results for Simulated Near, Far, and Double Talk Scenarios with and without Noise for Various Cross-Terms.

Table 1 shows experimental results for simulations with and without near-end noise. Speech distortion during near-end single-talk was measured as the Itakura-Saito distortion ISD between $\hat{s}_n$ and $s_n$. These results are shown in rows labeled "ISD-Near." The clean signal $s_n$ was available since a room simulator was used to generate the microphone input $z_n$. The Itakura-Saito distortion was also used to measure double-talk performance. These results are shown in rows labeled "ISD-DT." An average ERLE was used to measure performance during far-end single-talk. These results are shown in rows labeled "ERLE-Far." Instead of normalizing by the microphone input, the ERLE was normalized by the near-end signal, $s_n$. In both noisy and noise-free cases, the residual echo was well suppressed (−23 dB ERLE) during far-end single-talk when the cross term is set to zero. The cross terms appear to be important when the near-end is active. In these cases, better performance was obtained using a guess at the cross term. During double-talk, substituting $\hat{Y}_n(k) [Z_n(k)+\hat{S}_{n-1}(k)]/2$ for the cross term provided very good results (10–14× improvement in ISD). During near-end single-talk, using $\hat{Y}_n(k)Z_n(k)$ in place of the cross term gave very good results when background noise was present (8× improvement in ISD). In both these cases, residual echo suppression was mild and distortion of the far-end was audible.

The results shown above in Table form are now shown in separate equations for each of the near-end single talk, far-end single talk, and double talk situations. For near-end single talk, the real and imaginary parts of the residual echo are estimated by a system using the following two equations.

$$R_m^2(k) = \frac{\left(Z_m^2(k) - E_m^2(k) - \hat{Y}_m(k)Z_m(k) - \hat{Y}_m^2(k)\right)^2}{\hat{Y}_m^2(k)}$$

$$R_{in}^2(k) = \frac{\left(Z_{in}^2(k) - E_{in}^2(k) - \hat{Y}_{in}(k)Z_{in}(k) - \hat{Y}_{in}^2(k)\right)^2}{\hat{Y}_{in}^2(k)}$$

For far-end single talk, the real and imaginary parts of the residual echo are estimated by a system using the following two equations.

$$R_m^2(k) = \frac{\left(Z_m^2(k) - E_m^2(k) - \hat{Y}_m^2(k)\right)^2}{\hat{Y}_m^2(k)}$$

$$R_{in}^2(k) = \frac{\left(Z_{in}^2(k) - E_{in}^2(k) - \hat{Y}_{in}^2(k)\right)^2}{\hat{Y}_{in}^2(k)}$$

And for double-talk, the real and imaginary parts of the residual echo are estimated by a system using the following two equations.

$$R_m^2(k) = \frac{\left(Z_m^2(k) - E_m^2(k) - \hat{Y}_m(k)(Z_m(k) + \hat{S}_{r(n-1)}(k))/2 - \hat{Y}_m^2(k)\right)^2}{\hat{Y}_m^2(k)}$$

$$R_{in}^2(k) = \frac{\left(Z_{in}^2(k) - E_{in}^2(k) - \hat{Y}_{in}(k)(Z_{in}(k) + \hat{S}_{i(n-1)}(k))/2 - \hat{Y}_{in}^2(k)\right)^2}{\hat{Y}_{in}^2(k)}$$

A residual echo estimator capable of calculating the cross-terms as shown above is shown in, and described with reference to, the remaining figures.

Figure 2:
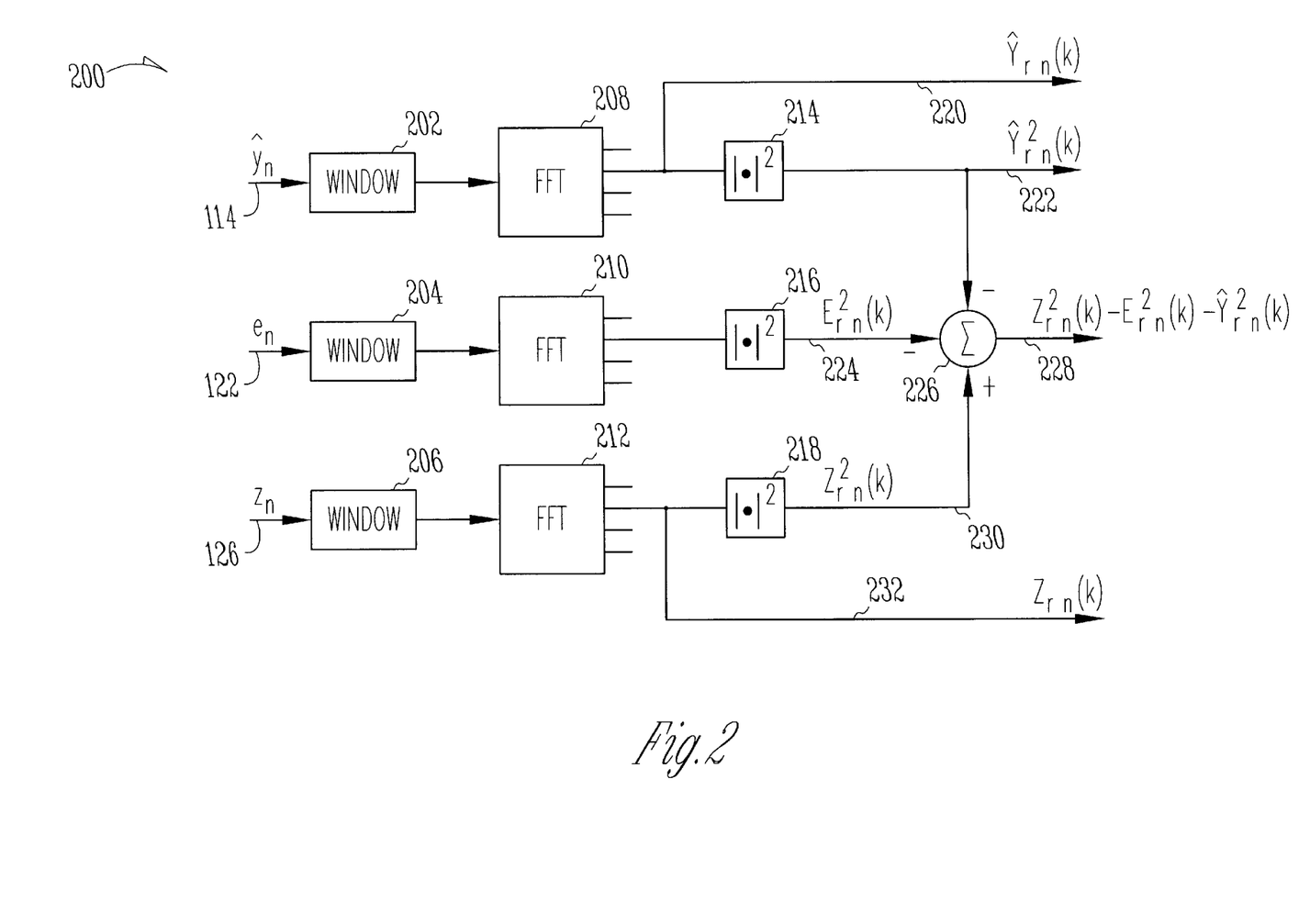
FIG. 2 shows a first portion of a cross-term calculator.

FIG. 2 shows a block diagram of a first portion of a residual echo estimator. Circuit 200 generates the real part of spectral components of $\hat{y}_n$, $e_n$ and $z_n$. Signals $\hat{y}_n$, $e_n$ and $z_n$ are shown on nodes 114, 122, and 126, respectively, which are input to window functions 202, 204, and 206 respectively. The index "n" is the block index. Any suitable windowing function can be applied, including rectangular, Hamming, or Hann windows. In some embodiments, window functions 202, 204, and 206 are omitted.

In some embodiments, AEC and NR are performed in the time domain. In these embodiments, Fast Fourier Transform (FFT) blocks 208, 210, and 212 are used to generate frequency domain representations of the signals $\hat{y}_n$, $e_n$ and $z_n$ for use in the residual echo estimator. In other embodiments, AEC and NR are performed in the frequency domain, and window blocks 202, 204, and 206, as well as FFT blocks 208, 210, and 212 are not present.

FFT block 208 generates $\hat{Y}_{rn}(k)$ on node 220, and provides the same to squaring function 214 which generates $\hat{Y}_{rn}^2(k)$ on node 222. FFT block 210 generates $\hat{E}_{rn}(k)$ and squaring function 216 generates $\hat{E}_{rn}^2(k)$ on node 224. FFT block 212 generates $\hat{Z}_{rn}(k)$ on node 232, and provides the same to squaring function 218 which generates $\hat{Z}_{rn}^2(k)$ on node 232. Summer 226 receives $\hat{Y}_{rn}^2(k)$, $\hat{E}_{rn}^2(k)$, and $\hat{Z}_{rn}^2(k)$ on nodes 222, 224, and 230, respectively, and produces $\hat{Z}_{rn}^2(k) - \hat{E}_{rn}^2(k) - \hat{Y}_{rn}^2(k)$ on node 228.

Circuit 200 generates the real part of spectral components of $\hat{y}_n$, $e_n$ and $z_n$. A complete residual echo estimator includes another circuit corresponding to circuit 200 that generates the imaginary parts of the same spectral components.

Figure 3:
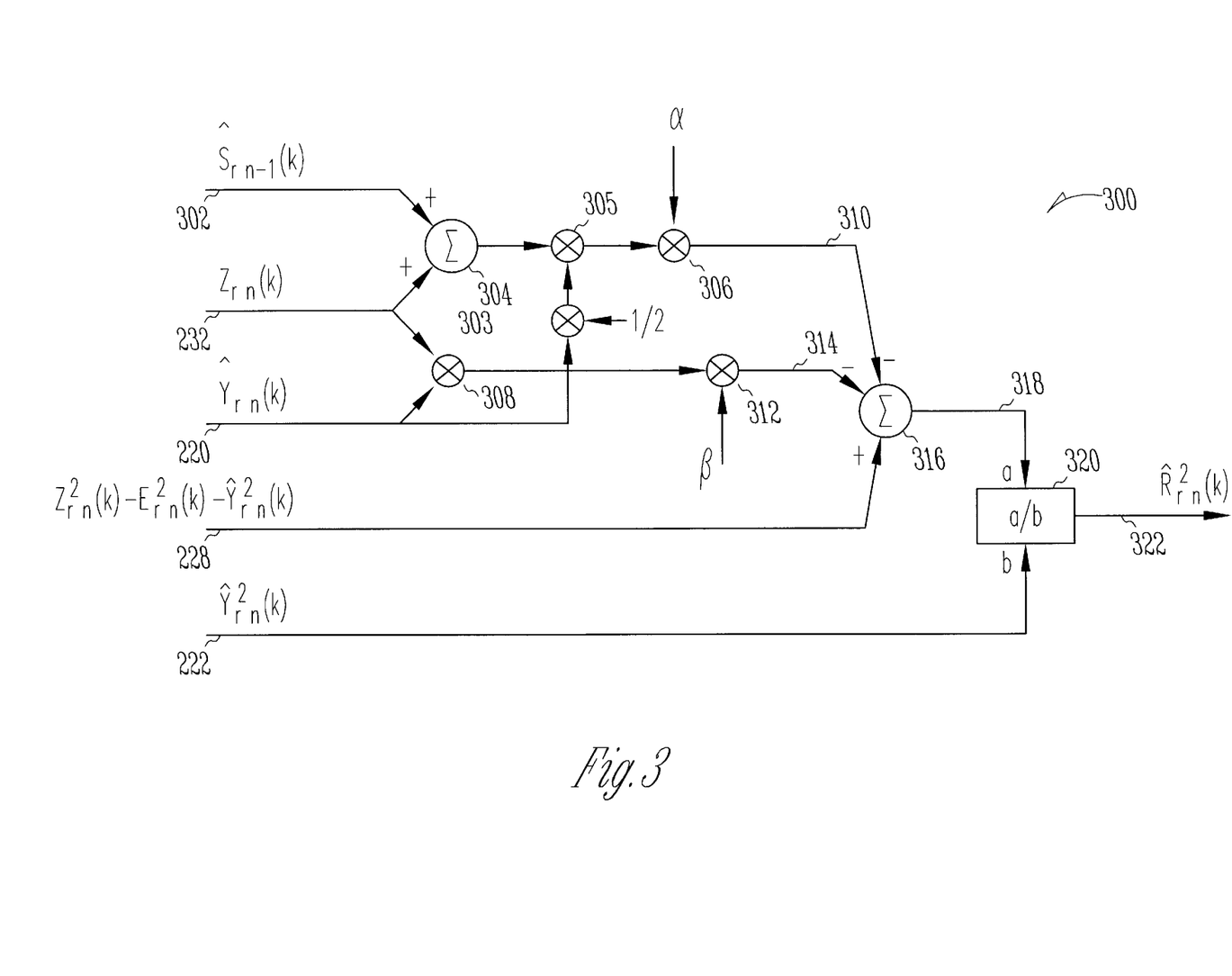
FIG. 3 shows a second portion of a cross-term calculator.

FIG. 3 shows a block diagram of a second portion of a residual echo estimator. Circuit 300 receives signals on nodes 232, 220, 228, and 222, which correspond to like-numbered nodes in FIG. 2. Circuit 300 also receives a signal on node 302, which corresponds to the spectral components of a previous output from a noise reduction circuit, such as noise reduction circuit 120 (FIG. 1). Summer 304 and multipliers 303 and 305 produce $\hat{Y}_{rn}(k)[Z_{rn}(k)+\hat{S}_{r(n-1)}(k)]/2$, which is used as the cross-term when a double-talk event is present. Multiplier 308 produces $\hat{Y}(k)Z_{rn}(k)$, which is used when there is near-end speech only. Multipliers 306 and 312 implement the switching between cross-terms when different speech activity is present.

In some embodiments (soft decision embodiments), the cross-terms produced on nodes 310 and 314 are produced in varying amplitudes, and are summed by summer 316. As a result, the numerator produced on node 318 includes components of both types of cross-terms. In soft decision embodiments, multipliers 306 and 312 produce variable output values that are a function of both the spectral components and $\alpha$ and $\beta$, and the outputs are summed by summer 316.

In other embodiments, (hard decision embodiments), $\alpha$ and $\beta$ take on values of "1" or "0," and multipliers 306 and 312 act as switches that either pass the input through, or do not pass the input through. For example, when $\alpha$ is a "1," multiplier 306 acts as a switch and passes $\hat{Y}_{rn}(k)[Z_{rn}(k)+\hat{S}_{r(n-1)}(k)]/2$ to node 310. In this case, multiplier 306 acts as a closed switch and multiplier 312 acts as an open switch. Also for example, when $\beta$ is a "1," multiplier 312 passes $\hat{Y}_m^2(k)Z_m(k)$ to node 314. In this case, multiplier 312 acts as a closed switch and multiplier 306 acts as an open switch. The generation of $\alpha$ and $\beta$ is discussed with reference to FIG. 4.

Divider 320 divides the numerator on node 318 by $\hat{Y}_m^2(k)$ on node 222 to produce $\hat{R}_m^2(k)$ on node 322. $\hat{R}_m^2(k)$ on node 322 represents the estimate of the square of the real part of the spectral component of the residual echo.

Summers 304 and 316, and multipliers 306, 308, and 312 form a cross-term calculator that calculates the various cross-terms shown above in Table 1. One skilled in the art will understand that other embodiments can be used for cross-term calculators without departing from the scope of the present invention. For example, all or part of circuit 300 can be implemented in software. The software can be executed on general purpose computer, a digital signal processor (DSP), or other processor. Also for example, all or part of circuit 300 can be implemented in special purpose hardware, such as an application specific integrated circuit (ASIC).

Figure 4:
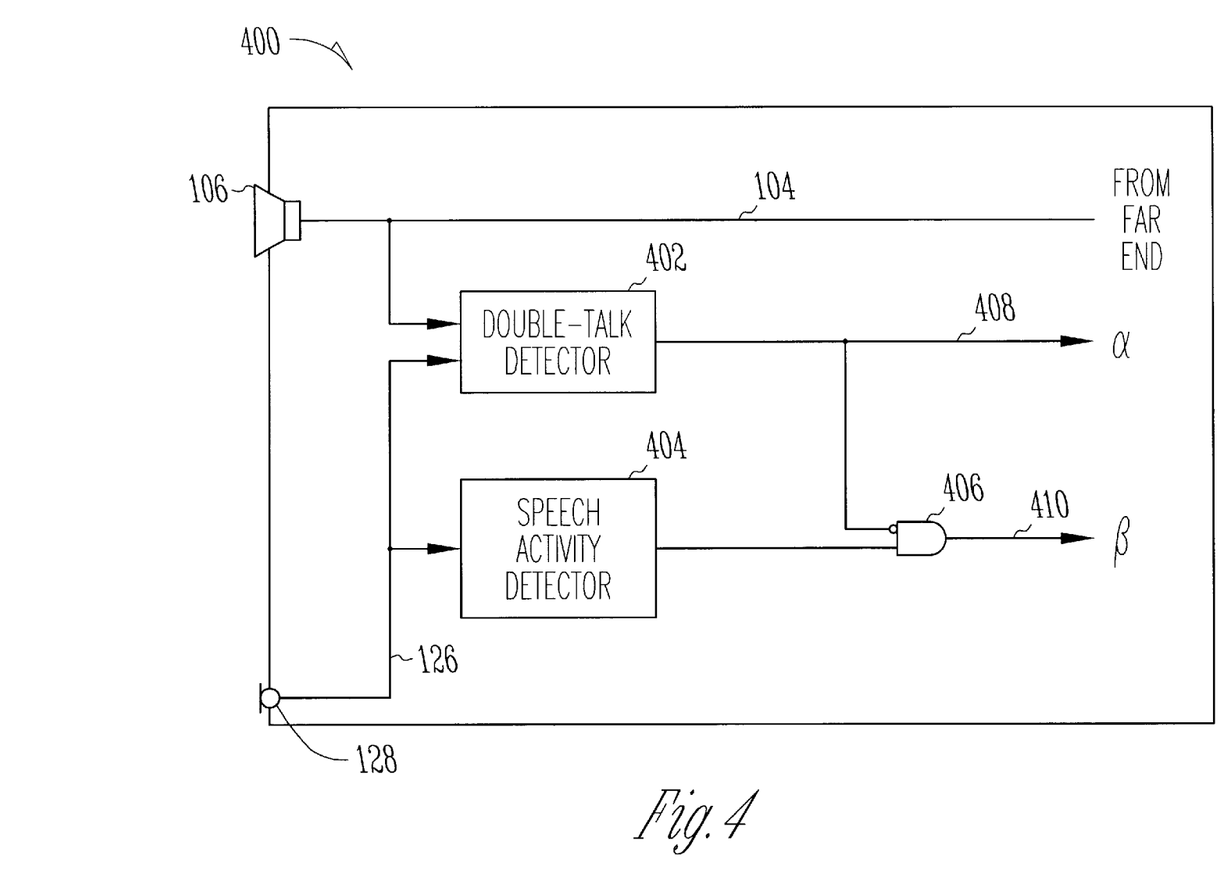
FIG. 4 shows speech activity detectors in a speakerphone context.

FIG. 4 shows a block diagram of speech activity detectors in a speakerphone context. In this embodiment, a speakerphone is implemented in a computer 400. Double talk detector 402 receives the far-end audio on node 104, and also receives the near-end audio on node 126 captured by microphone 128. In hard decision embodiments, double-talk detector 402 sets $\alpha$ equal to one when double-talk is active and sets $\alpha$ equal to zero otherwise. Speech activity detector 404 receives the near-end audio on node 126 and determines if speech signals are present at the microphone. AND gate 406 receives the output of speech activity detector 404 and the logical inverse of $\alpha$ on node 408. Gate 406 generates variable $\beta$ on node 410. In hard decision embodiments, $\beta$ is set to one if there is no double-talk but there is near-end speech activity. Otherwise $\beta$ is set to zero. In soft decision embodiments, $\alpha$ and $\beta$ take on real values between zero and one, inclusively. For example, in one embodiment, $\alpha$ takes on a value between zero and one, and $\beta$ is generated by a multiplier rather than gate 406. In such an embodiment, the multiplier generates $\beta$ as $\beta=(1-\alpha)*$(speech activity detector output).

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An acoustic echo cancellation system comprising:

an adaptive filter to create an echo estimate and an error term that includes a residual echo;

a residual echo estimator to independently calculate estimates of a real portion and an imaginary portion of a discrete Fourier transform (DFT) of the residual echo, wherein the residual echo estimator includes:

a first input node to receive a composite signal comprising near-end speech, noise, and an echo of far-end speech;

a second input node to receive the echo estimate; and a third input node to receive a difference between the echo estimate and the composite signal; and wherein the residual echo estimator is configured to calculate the real and imaginary portions of the DFT of the residual echo using an average of the composite signal and a previous output sample as an estimate of the near-end speech and the noise when both the near-end speech and the far-end speech are active.

2. The acoustic echo cancellation system of claim 1, wherein the residual echo estimator is further configured to calculate the real and imaginary portions of the DFT of the residual echo using the composite signal as an estimate of the near-end speech and the noise when the near-end speech is active and far-end speech is quiet.

3. The acoustic echo cancellation system of claim 1 further including a noise reduction circuit responsive to the real and imaginary portions of the DFT of the residual echo and the difference between the echo estimate and the composite signal.

4. An acoustic echo cancellation system, comprising:

an adaptive filter to create an echo estimate and an error term that includes a residual echo;

a residual echo estimator to independently calculate estimates of a real portion and an imaginary portion of a discrete Fourier transform (DFT) of the residual echo, wherein the residual echo estimator includes:

a first input node to receive a composite signal comprising near-end speech, noise, and an echo of far-end speech;

a second input node to receive the echo estimate; and a third input node to receive a difference between the echo estimate and the composite signal; and wherein the residual echo estimator is configured to calculate the real and imaginary portions of the DFT of the residual echo using a value of substantially zero as an estimate of the near-end speech and the noise when the near-end speech is quiet and the far-end speech is active.

5. The acoustic echo cancellation system of claim 4 further including a noise reduction circuit responsive to the real and imaginary portions of the DFT of the residual echo and the difference between the echo estimate and the composite signal.

6. The acoustic echo cancellation system of claim 4, wherein the residual echo estimator is further configured to calculate the real and imaginary portions of the DFT of the residual echo using the composite signal as an estimate of the near-end speech and the noise when the near-end speech is active and far-end speech is quiet.

7. A speakerphone comprising:

an output port to be coupled to a speaker to project far-end speech into an acoustic environment;

an input port to be coupled to a microphone to receive from the acoustic environment a composite signal comprising near-end speech, noise, and an echo of the far-end speech;

an adaptive filter to produce an estimate of the echo of the far-end speech; and a residual echo estimator to independently estimate real and imaginary parts of the DFT of the difference between the echo of the far-end speech and the estimate of the echo of the far-end speech, wherein the residual echo estimator includes a cross-term calculator to calculate an estimate of a cross-term resulting from a lack of an assumption that the near-end speech, the noise, and the echo of the far-end speech are statistically independent and to estimate a sum of the near-end speech and the noise differently based on whether the far-end speech or the near-end speech have energy above a threshold.

8. The speakerphone of claim 7 wherein the cross-term calculator is configured to estimate the sum as the composite signal when a near-end speech activity detector indicates that the near-end speech has energy above the threshold and a double-talk detector indicates the far-end speech has energy below a threshold.

9. The speakerphone of claim 7 wherein the speakerphone is implemented in a computer.

10. A speakerphone comprising:

an output port to be coupled to a speaker to project far-end speech into an acoustic environment;

an input port to be coupled to a microphone to receive from the acoustic environment a composite signal comprising near-end speech, noise, and an echo of the far-end speech;

an adaptive filter to produce an estimate of the echo of the far-end speech; and a residual echo estimator to independently estimate real and imaginary parts of the DFT of the difference between the echo of the far-end speech and the estimate of the echo of the far-end speech, wherein the residual echo estimator includes a cross-term calculator to calculate an estimate of a cross-term resulting from a lack of an assumption that the near-end speech, the noise, and the echo of the far-end speech are statistically independent; and a noise reduction circuit responsive to the real and imaginary parts of the residual echo to produce estimates of the near-end speech; and a circuit to estimate a sum of the near-end speech and the noise, the circuit being responsive to a double-talk indicator, the circuit being configured to estimate the sum as an average of the composite signal and a previous estimate of the near-end speech.

11. A method of estimating residual echo in an acoustic echo cancellation system, the method comprising separately estimating real and imaginary parts of the DFT of the residual echo, wherein separately estimating comprises:

estimating the real part of the DFT of the residual echo from a real part of a DFT of a near-end composite signal, a real part of a DFT of an adaptive filter output signal, a real part of a DFT of an error signal generated by a difference between the near-end composite signal and the adaptive filter output signal, and an approximation of a sum of a real part of a DFT of a near-end speech signal and a real part of a DFT of a near-end noise signal.

12. The method of claim 11 wherein the square of the real part of the DFT of the residual echo is estimated according to an equation $$R_m^2(k) = \frac{(Z_m^2(k) - E_m^2(k) - \hat{Y}_m(k)(S_m(k) + V_m(k)) - \hat{Y}_m^2(k))^2}{\hat{Y}_m^2(k)}$$

wherein:

$R_m(k)$ is the real part of the DFT of the residual echo;

$E_m(k)$ is the real part of the DFT of the error signal;

$Z_m(k)$ is the real part of the DFT of the near-end composite signal;

$\hat{Y}_m(k)$ is the real part of the DFT of the adaptive filter output signal; and $(S_m(k)+V_m(k))$ represents the approximation of the sum of the real part of the DFT of the near-end speech signal and the real part of the DFT of the near-end noise signal.

13. The method of claim 12 further comprising:

using the real part of the DFT of the near-end composite signal to approximate the sum of the real part of the DFT of the near-end speech signal and the real part of the DFT of the near-end noise signal when a near-talker is quiet.

14. The method of claim 13 wherein the square of the real part of the DFT of the residual echo is estimated according to an equation:

$$R_m^2(k) = \frac{(Z_m^2(k) - E_m^2(k) - \hat{Y}_m(k)Z_m(k) - \hat{Y}_m^2(k))^2}{\hat{Y}_m^2(k)}.$$

15. The method of claim 12 further comprising:

using a value of substantially zero to approximate the sum of the real part of the DFT of the near-end speech signal and the real part of the DFT of the near-end noise signal only when a near-end talker is quiet.

16. The method of claim 15, wherein the square of the real part of the DFT of the residual echo is estimated according to an equation $$R_m^2(k) = \frac{(Z_m^2(k) - E_m^2(k) - \hat{Y}_m(k))^2}{\hat{Y}_m^2(k)}.$$

17. The method of claim 11 further comprising:

using a sum of the real part of the DFT of the near-end composite signal and a DFT of a previous output from the acoustic echo cancellation system to approximate the sum of the real part of the DFT of the near-end speech signal and the real part of the DFT of the near-end noise signal when a double-talk event is present.

18. The method of claim 17 wherein the square of the real part of the DFT of the residual echo is estimated according to an equation:

$$R_m^2(k) = \frac{(Z_m^2(k) - E_m^2(k) - \hat{Y}_m(k)(Z_m(k) + \hat{S}_{r(n-1)}(k))/2 - \hat{Y}_m^2(k))^2}{\hat{Y}_m^2(k)}$$

where $\hat{S}_{r(n-1)}(k)$ represents the real part of the DFT of the previous output from the acoustic echo cancellation system.

19. The method of claim 11 wherein separately estimating further comprises:

estimating the imaginary part of the DFT of the residual echo using an equation that includes a cross-term resulting from a lack of an assumption that signal components in a near-end composite signal received at a microphone are statistically independent.

20. A method of estimating residual echo in an acoustic echo cancellation system, the method comprising separately estimating real and imaginary parts of the DFT of the residual echo, wherein separately estimating includes estimating the imaginary part of the DFT of the residual echo using an equation that includes a cross-term resulting from a lack of an assumption that signal components in a near-end composite signal received at a microphone are statistically independent, wherein the cross-term includes a product of an imaginary part of a DFT of an echo estimate and a sum of an imaginary part of a DFT of a near-end speech signal and an imaginary part of a DFT of a near-end noise signal, and wherein estimating the imaginary part of the DFT of the residual echo includes:

substituting a different product for the cross-term as a function of whether the near-end speech signal contains sufficient energy and whether the far-end speech signal contains sufficient energy.

21. A method of estimating residual echo in an acoustic echo cancellation system, the method comprising separately estimating real and imaginary parts of the DFT of the residual echo, wherein separately estimating includes estimating the imaginary part of the DFT of the residual echo using an equation that includes a cross-term resulting from a lack of an assumption that signal components in a near-end composite signal received at a microphone are statistically independent, wherein the square of the imaginary part of the DFT of the residual echo is estimated according to an equation $$R_{in}^2(k) = \frac{\left(Z_{in}^2(k) - E_{in}^2(k) - \hat{Y}_{in}(k)(S_{in}(k) + V_{in}(k)) - \hat{Y}_{in}^2(k)\right)^2}{\hat{Y}_{in}^2(k)}$$

wherein:

$R_{in}(k)$ is the imaginary part of the DFT of the residual echo;

$E_{in}(k)$ is the imaginary part of the DFT of the error signal;

$Z_{in}(k)$ is the imaginary part of the DFT of the near-end composite signal;

$\hat{Y}_{in}(k)$ is the imaginary part of the DFT of the adaptive filter output signal; and $(S_{in}(k)+V_{in}(k))$ represents the approximation of the sum of the imaginary part of the DFT of the near-end speech signal and the imaginary part of the DFT of the near-end noise signal.

22. The method of claim 21 further comprising:

using the imaginary part of the DFT of the near-end composite signal to approximate the sum of the imaginary part of the DFT of the near-end speech signal and the imaginary part of the DFT of the near-end noise signal when a near-talker is quiet.

23. The method of claim 22 wherein the square of the imaginary part of the DFT of the residual echo is estimated according to an equation $$R_{in}^2(k) = \frac{\left(Z_{in}^2(k) - E_{in}^2(k) - \hat{Y}_{in}(k)Z_{in}(k) - \hat{Y}_{in}^2(k)\right)^2}{\hat{Y}_{in}^2(k)}.$$

24. The method of claim 21 further comprising:

using a value of substantially zero to approximate the sum of the imaginary part of the DFT of the near-end speech signal and the imaginary part of the DFT of the near-end noise signal only when a near-end talker is quiet.

25. The method of claim 24 wherein the square of the imaginary part of the DFT of the residual echo is estimated according to an equation:

$$R_{in}^2(k) = \frac{\left(Z_{in}^2(k) - E_{in}^2(k) - \hat{Y}_{in}^2(k)\right)^2}{\hat{Y}_{in}^2(k)}.$$

26. A method of estimating residual echo in an acoustic echo cancellation system, the method comprising:

separately estimating real and imaginary parts of the DFT of the residual echo, wherein separately estimating includes estimating the imaginary part of the DFT of the residual echo using an equation that includes a cross-term resulting from a lack of an assumption that signal components in a near-end composite signal received at a microphone are statistically independent, and using a sum of the imaginary part of the DFT of the near-end composite signal and a DFT of a previous output from the acoustic echo cancellation system to approximate the sum of the imaginary part of the DFT of the near-end speech signal and the imaginary part of the DFT of the near-end noise signal when a double-talk event is present.

27. The method of claim 26 wherein the square of the imaginary part of the DFT of the residual echo is estimated according to an equation:

$$R_{in}^2(k) = \frac{\left(Z_{in}^2(k) - E_{in}^2(k) - \hat{Y}_{in}(k)\left(Z_{in}(k) + \hat{S}_{i(n-1)}(k)\right)/2 - \hat{Y}_{in}^2(k)\right)^2}{\hat{Y}_{in}^2(k)}$$

where $\hat{S}_{i(n-1)}(k)$ represents the imaginary part of the DFT of the previous output from the acoustic echo cancellation system.

* * * * *